(12) United States Patent
Shindo et al.

(10) Patent No.: US 11,204,132 B2
(45) Date of Patent: Dec. 21, 2021

(54) TANK PRODUCTION METHOD AND TANK

(71) Applicant: TOYOTA JIDOSHA KABUSHIKI KAISHA, Toyota (JP)

(72) Inventors: Tatsunori Shindo, Toyota (JP); Koichiro Hayashi, Anjyo (JP); Takashi Inoh, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 250 days.

(21) Appl. No.: 16/128,870

(22) Filed: Sep. 12, 2018

(65) Prior Publication Data
US 2019/0128477 A1    May 2, 2019

(30) Foreign Application Priority Data
Oct. 31, 2017 (JP) .............................. JP2017-211187

(51) Int. Cl.
*B29C 53/60* (2006.01)
*F17C 1/16* (2006.01)
(Continued)

(52) U.S. Cl.
CPC ................ *F17C 1/16* (2013.01); *B29C 53/60* (2013.01); *B29C 53/8016* (2013.01);
(Continued)

(58) Field of Classification Search
CPC ..... B29C 53/56; B29C 53/587; B29C 53/602; B29C 70/32
See application file for complete search history.

(56) References Cited

U.S. PATENT DOCUMENTS 2,982,457 A * 5/1961 Gaetano ............... B29D 23/001
229/4.5
3,508,677 A * 4/1970 Laibson .............. B29C 66/7392
220/590
(Continued)

FOREIGN PATENT DOCUMENTS

JP    H03-108366 U    11/1991
JP    2016-089891 A    10/2014
(Continued)

*Primary Examiner* — Matthew J Daniels
(74) *Attorney, Agent, or Firm* — Dickinson Wright. PLLC (57) ABSTRACT

A tank production method for preventing generation of non-uniform stacked portions in a sheet layer while securing the strength of the tank, the method including a winding step of winding resin-impregnated fiber sheets to form a sheet layer with a predetermined thickness. The winding step includes divided winding steps of winding divided fiber sheets obtained by dividing a fiber sheet into a plurality of divided fiber sheets having a length shorter than the length required to form the sheet layer with the predetermined thickness. The second divided winding step or each of the second and following divided winding step satisfies an Inequality: $X > (\sigma \cdot t \cdot L)/(A \cdot W)$, where an overlapped length of the start end of a new divided fiber sheet stacked on the terminal end of the divided fiber sheet wound in the preceding divided winding step is X, the tensile stress applied to the tank in the circumferential direction thereof is $\sigma$, the thickness and width of each divided fiber sheet are t and W, respectively, the length of a cylindrical portion of the tank is L, and the shearing strength of the resin is A.

2 Claims, 9 Drawing Sheets

(51) Int. Cl.
    *B29C 70/32*     (2006.01)
    *B29C 53/80*     (2006.01)
    *B29C 70/16*     (2006.01)
    *B29C 70/34*     (2006.01)
    *F17C 1/06*     (2006.01)

(52) U.S. Cl.
    CPC .............. *B29C 70/16* (2013.01); *B29C 70/32* (2013.01); *B29C 70/34* (2013.01); *F17C 1/06* (2013.01); *F17C 2201/0109* (2013.01); *F17C 2201/0128* (2013.01); *F17C 2203/066* (2013.01); *F17C 2203/068* (2013.01); *F17C 2203/0668* (2013.01); *F17C 2209/2154* (2013.01); *F17C 2221/012* (2013.01); *F17C 2223/035* (2013.01); *F17C 2270/0168* (2013.01)

(56) References Cited

U.S. PATENT DOCUMENTS

| | | | | |
|---|---|---|---|---|
| 3,879,244 | A * | 4/1975 | Varlas | B29C 53/56 156/192 |
| 7,601,288 | B2 * | 10/2009 | Dunleavy | B29C 70/00 264/258 |
| 8,883,060 | B2 * | 11/2014 | Nakamura | B29C 70/32 264/258 |
| 2016/0354970 | A1 | 12/2016 | Taki | |
| 2017/0136716 | A1 | 5/2017 | Shindo et al. | |

FOREIGN PATENT DOCUMENTS

| | | | |
|---|---|---|---|
| JP | 2016-223569 | A | 12/2016 |
| JP | 3052457 | B1 | 12/2016 |

* cited by examiner

TANK PRODUCTION METHOD AND TANK

CROSS REFERENCE TO RELATED APPLICATIONS

The present application claims priority from Japanese patent application JP 2017-211187 filed on Oct. 31, 2017, the content of which is hereby incorporated by reference into this application.

BACKGROUND

Technical Field

The present disclosure relates to a tank production method and a tank.

Background Art

Conventionally, inventions related to tank production methods have been known (see JP 2016-223569 A). JP 2016-223569 A discloses a method for producing a tank with a liner, the method including the following steps (A) to (C) (see claim 1 and the like of JP 2016-223569 A).

The step (A) is a step of winding sheet-like fibers impregnated with resin on a mandrel with higher rigidity than that of the liner, and heating and curing the resin so as to form a sheet layer. The step (B) is a step of pulling out the mandrel from the sheet layer. The step (C) is a step of fitting the liner into the sheet layer, following the step (B).

According to such a production method, since a fiber sheet impregnated with resin is wound on a mandrel with higher rigidity than that of the liner, the fiber sheet can be wound on the mandrel with a higher tension than that when the fiber sheet is wound on the liner. Therefore, generation of deflection of the sheet layer can be suppressed, and thus, a tank can be formed with high accuracy (see paragraph 0006 and the like of JP 2016-223569 A).

SUMMARY

According to the aforementioned conventional tank production method, a sheet layer with a predetermined thickness is formed by continuously winding a fiber sheet, which has a width equal to the axial length of the straight portion of the liner, several ten turns on the mandrel along the circumferential direction thereof, using a sheet winding method.

The inventors of the present application have conducted concentrated studies and found that when a fiber sheet is continuously wound at once, there is a possibility that the resulting sheet layer may have generated therein non-uniform stacked portions, such as distortion or local gaps of the fiber sheet, due to slight fluctuations of the tension applied thereto, very small variations in the thickness of the fiber sheet, and the like.

The present disclosure provides a tank production method and a tank, capable of preventing generation of non-uniform stacked portions in a sheet layer while securing the strength of the tank.

According to an embodiment of the present disclosure, there is provided a tank production method, which includes a winding step of winding a fiber sheet impregnated with resin so as to form a sheet layer with a predetermined thickness, in which the winding step includes a plurality of divided winding steps of winding divided fiber sheets that have been obtained by dividing a fiber sheet into a plurality of divided fiber sheets having a length shorter than the length required to form the sheet layer with the predetermined thickness, and the second divided winding step or each of the second and following divided winding step satisfies an Inequality: $X > (\sigma \cdot t \cdot L)/(A \cdot W)$, where an overlapped length of the start end of a new divided fiber sheet that is stacked in an overlapped manner on the terminal end of the divided fiber sheet wound in the preceding divided winding step is indicated by X, the tensile stress applied to the tank in the circumferential direction thereof is indicated by $\sigma$, the thickness and width of each divided fiber sheet are indicated by t and W, respectively, the length of a cylindrical portion of the tank is indicated by L, and the shearing strength of the resin that forms the sheet layer is indicated by A.

The inventors of the present application have found that when a fiber sheet with a length, which can form a sheet layer with a predetermined thickness, is stacked by being continuously wound at once, there is a possibility that the resulting sheet layer may have generated therein non-uniform stacked portions, such as distortion or local gaps of the fiber sheet. In addition, the inventors of the present application have completed the invention of the present application by finding that such non-uniform stacked portions of the fiber sheet may expand with an increase in the number of turns of the fiber sheet, and thus, dents such as wrinkles, which would traverse the wound direction of the fiber sheet, may be generated on the surface of the tank.

In the tank production method in accordance with the aforementioned embodiment of the invention of the present application, the winding step of winding a fiber sheet impregnated with resin so as to form a sheet layer with a predetermined thickness includes a plurality of divided winding steps as described above. Each divided winding step is a step of winding a divided fiber sheet that has been obtained by dividing a fiber sheet into a plurality of divided fiber sheets having a length shorter than the length required to form the sheet layer with the predetermined thickness as described above.

That is, the winding step of the tank production method of the aforementioned embodiment does not include continuously winding a single fiber sheet having a length required to form a sheet layer with a predetermined thickness. Instead, the fiber sheet is divided into a plurality of divided fiber sheets having a length shorter than the length required to form the sheet layer with the predetermined thickness so as to provide a plurality of divided fiber sheets, and the divided fiber sheets are wound through a plurality of divided winding steps so as to form the sheet layer with the predetermined thickness. Accordingly, in each divided winding step, a divided fiber sheet can be wound with a more uniform tension applied thereto in comparison with a non-uniform tension that would be when a single long fiber sheet is continuously wound.

Therefore, according to the tank production method of the aforementioned embodiment, it is possible to uniformly stack divided fiber sheets while preventing generation of distortion or local gaps of the divided fiber sheets that form the sheet layer, independently of very small variations in the thickness of the divided fiber sheets and the like. Accordingly, generation of dents such as wrinkles, which would traverse the wound direction of the divided fiber sheets, on the surface of the sheet layer of the tank can be prevented.

In addition, in the tank production method of the aforementioned embodiment, in the second divided winding step or each of the second and following divided winding step, an overlapped length of the start end of a new divided fiber sheet that is stacked in an overlapped manner on the terminal end of the divided fiber sheet wound in the preceding divided winding step satisfies Formula (1) below, as described above.

$$X > (\sigma \cdot t \cdot L)/(A \cdot W) \quad (1)$$

It should be noted that in Formula (1) above, symbol X indicates the overlapped length of the terminal end and the start end of the divided fiber sheets. Symbol σ indicates the tensile stress applied to the tank in the circumferential direction thereof. Symbol L indicates the length of the cylindrical portion of the tank along the central axis direction thereof excluding the dome-like portions. Symbol A indicates the shearing strength of resin that forms the sheet layer. Symbol W indicates the width of each divided fiber sheet.

When the tank is filled with a fluid such as high-pressure gas, tensile stress in the circumferential direction of the tank is applied to the divided fiber sheets that form the sheet layer of the tank. Herein, provided that the internal pressure of the tank is indicated by $P_{in}$, the radius of the sheet layer is indicated by R, the thickness of the sheet layer is indicated by T, and the central angle of the cross-section of the tank along the radial direction thereof is indicated by dθ, the balance of a force on the cylindrical tank that receives the internal pressure $P_{in}$ can be represented by Formula (2) below.

$$P_{in} \cdot R \cdot d\theta - 2 \cdot \sigma \cdot T \cdot \sin(d\theta/2) = 0 \quad (2)$$

Herein, if dθ is sufficiently small, approximation can be performed such that $\sin(d\theta/2) \approx d\theta/2$ in Formula (2) above. Therefore, Formula (3) below is derived.

$$\sigma = (P_{in}/T) \cdot R \quad (3)$$

For example, assume that the internal pressure $P_{in}$ of the tank is 160 MPa, the thickness T of the sheet layer is 3 mm, and the radius R of the sheet layer is 60 mm. In such a case, tensile stress σ applied to the sheet layer in the circumferential direction thereof is calculated as 3200 Mpa from Formula (3) above.

In the sheet layer, if a shear load on the overlapped portion of the terminal end of the divided fiber sheet wound on the lower layer side and the start end of the divided fiber sheet wound thereon on the upper layer side is greater than a tensile load applied to the divided fiber sheets, it can be said that the overlapped portion has a sufficient shearing strength. That is, as long as Formula (4) below is satisfied, it can be said that the overlapped portion of the terminal end of the divided fiber sheet on the lower layer side and the start end of the divided fiber sheet on the upper layer side has a sufficient shearing strength.

$$\sigma \cdot t \cdot L < A \cdot X \cdot W \quad (4)$$

In Formula (4) above, symbol σ indicates the tensile stress applied to the tank in the circumferential direction thereof. Symbols t and W indicate the thickness and width of a single layer of each divided fiber sheet, respectively. Symbol L indicates the length of the cylindrical portion of the tank along the central axis direction thereof excluding the dome-like portions. Symbol A indicates the shearing strength of resin that forms the sheet layer. Symbol X indicates the overlapped length of the terminal end and the start end of the divided fiber sheets.

The left side of Formula (4) above is a tensile load applied to the divided fiber sheets. The right side of Formula (4) above indicates a shear load on the overlapped portion of the terminal end of the divided fiber sheet wound on the lower layer side and the start end of the divided fiber sheet wound thereon on the upper layer side. Deforming Formula (4) above can obtain Formula (1) above.

Therefore, when Formula (1) above is satisfied, the overlapped portion of the terminal end of the divided fiber sheet on the lower layer side that form the sheet layer and the start end of the divided fiber sheet wound thereon on the upper layer side can have a sufficient shearing strength. Therefore, according to the tank production method of the aforementioned embodiment, it is possible to secure the strength of a tank produced by winding a plurality of divided fiber sheets through a plurality of divided winding steps of the winding step.

In each divided winding step of some embodiments of the tank production method of the aforementioned embodiment, the length of each divided fiber sheet is set to a length that allows the divided fiber sheet to be wound one to two turns on the tank along the circumferential direction thereof so that the divided fiber sheet can be stacked in one to two layers on the tank along the radial direction thereof. Accordingly, deviation or distortion of the divided fiber sheets can be significantly suppressed while they are wound.

Another embodiment of the present disclosure is a tank including a sheet layer with a predetermined thickness, in which the sheet layer includes a plurality of divided fiber sheets that have been stacked by being wound on the tank along the circumferential direction thereof and integrated by resin, and an Inequality: $X > (\sigma \cdot t \cdot L)/(A \cdot W)$ is satisfied, where an overlapped length of the start end of a divided fiber sheet on the upper layer side that is stacked in an overlapped manner on the terminal end of a divided fiber sheet wound on the lower layer side is indicated by X, the maximum tensile stress applied to the tank in the circumferential direction thereof is indicated by σ, the thickness and width of each divided fiber sheet are indicated by t and W, respectively, the length of the cylindrical portion of the tank is indicated by L, and the shearing strength of the resin is indicated by A.

Since the tank of the aforementioned embodiment has a sheet layer including a plurality of divided fiber sheets that have been stacked by being wound on the tank along the circumferential direction thereof and integrated by resin, such a tank can be produced using the tank production method of the aforementioned embodiment. Therefore, generation of distortion or local gaps of the divided fiber sheets that form the sheet layer can be prevented, and thus, the fiber sheets can be stacked uniformly. Accordingly, generation of dents such as wrinkles, which would traverse the wound direction of the divided fiber sheets, on the surface of the sheet layer of the tank can be prevented.

In addition, as the tank of the aforementioned embodiment satisfies the inequality: $X > (\sigma \cdot t \cdot L)/(A \cdot W)$, it is possible to secure the strength of a tank produced by winding a plurality of divided fiber sheets as in the tank production method of the aforementioned embodiment.

According to the tank production method and the tank of the aforementioned embodiment, it is possible to prevent generation of non-uniform stacked portions in a sheet layer while securing the strength of the tank, thereby suppressing generation of dents such as wrinkles, which would traverse the wound direction of the divided fiber sheets, on the surface of the sheet layer.

DETAILED DESCRIPTION

Hereinafter, embodiments of a tank production method and a tank in accordance with the present disclosure will be described with reference to the drawings.

Figure 1:
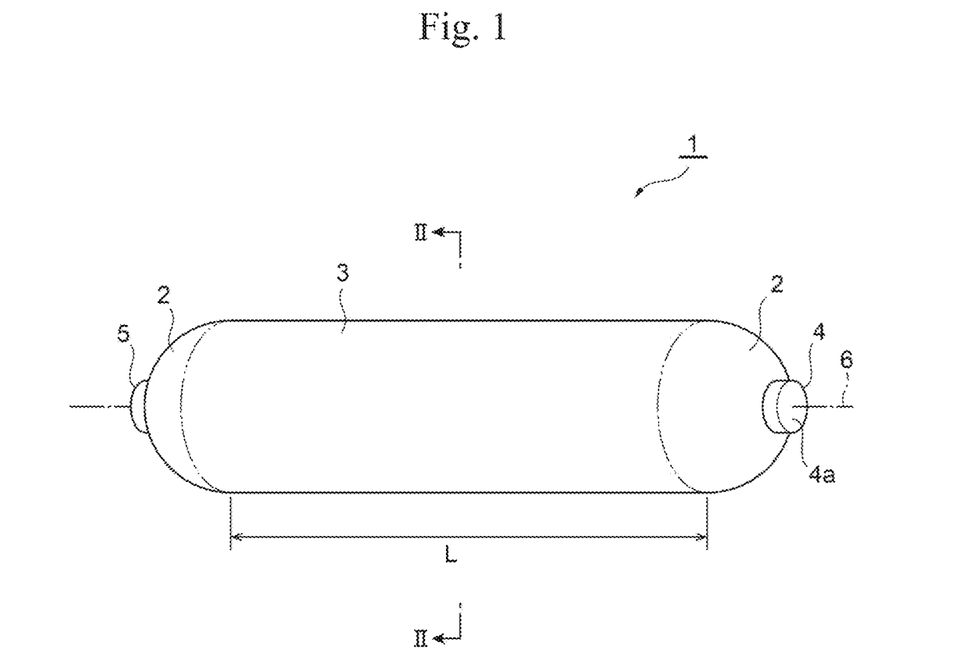
FIG. 1 is a schematic perspective view of a tank in accordance with an embodiment of the present disclosure.

FIG. 1 is a schematic perspective view of a tank 1 in accordance with an embodiment of the present disclosure. The tank 1 of this embodiment is a high-pressure tank adapted to store fuels for use in natural gas automobiles or fuel cell automobiles, for example. The tank 1 of this embodiment can be used for applications for storing high-pressure hydrogen gas of about 70 MP, for example.

The tank 1 of this embodiment has, for example, hemispherical dome-like portions 2 provided at opposite ends thereof along the direction of the central axis 6, and a cylindrical portion 3 provided between the dome-like portions 2. In addition, the tank 1 has mouthpieces 4, 5 provided at opposite ends thereof along the direction of the central axis 6. One mouthpiece 4 has a through-hole 4a that communicates with the inside of the tank 1, for example, and the other mouthpiece 5 has a recess portion for attaching a shaft for supporting the tank 1 during the production of the tank 1, for example.

Figure 2:
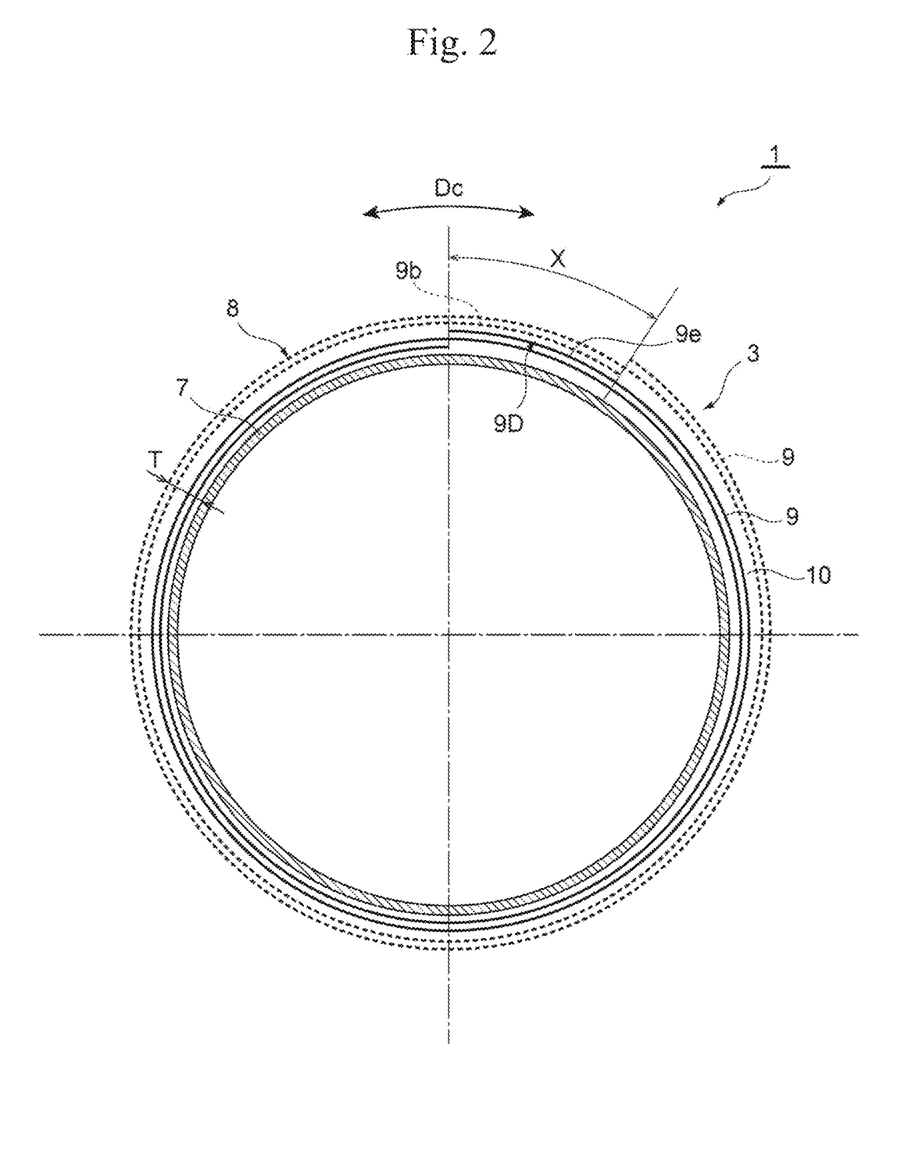
FIG. 2 is a schematic cross-sectional view along line II-II of the tank illustrated in FIG. 1.

FIG. 2 is a schematic cross-sectional view along line II-II of the tank illustrated in FIG. 1. The tank 1 of this embodiment is a tank 1 with a multilayer structure, for example, and includes a liner 7 that forms the innermost layer, and a sheet layer 8 with a predetermined thickness T that forms the outermost layer. Though not shown, the tank 1 may further include a fiber layer as the outermost layer, and the sheet layer 8 as an intermediate layer between the liner 7 and the fiber layer. The fiber layer can be formed by, for example, helically winding fiber bundles of glass fibers, carbon fibers, or the like, which are impregnated with resin, around the sheet layer 8, using a filament winding method.

The liner 7 is, for example, a hollow container made of resin that has the mouthpieces 4, 5 attached to opposite ends thereof along the direction of the central axis 6. Examples of the material for forming the liner 7 include, but are not particularly limited to, thermoplastic resin, such as polyethylene, nylon, polypropylene, and polyester. Examples of the material for forming the mouthpieces 4, 5 include metal, such as aluminum or stainless steel. It should be noted that the mouthpiece 5 for attaching a shaft for supporting the tank 1 during the production of the tank 1 may be omitted.

The sheet layer 8 includes a plurality of divided fiber sheets 9 that have been stacked by being wound on the tank 1 along the circumferential direction thereof, and integrated by resin. The number of the divided fiber sheets 9 that form the sheet layer 8 is plural, that is, any number more than one. It should be noted that in FIG. 2, a divided fiber sheet 9 on the lower layer side that has been stacked by being wound on the tank 1 along the circumferential direction Dc thereof is indicated by the solid line, a divided fiber sheet 9 wound thereon on the upper layer side is indicated by the dotted line, and a divided fiber sheet 9 of the third and following layers is omitted.

Each divided fiber sheet 9 is, for example, an aggregate of fibers obtained by aligning fiber bundles of glass fibers, carbon fibers, or the like, and shaping them into a sheet form with a predetermined width, length, and thickness. Each of the plurality of divided fiber sheets 9 is, for example, impregnated with liquid resin 10, and is stacked by being wound one or more turn on the tank 1 along the circumferential direction Dc thereof, and is then, as a result of the resin 10 being cured, integrated by the resin 10, thereby forming the sheet layer 8. Examples of the resin 10 for impregnating the plurality of divided fiber sheets 9 so as to integrate them include thermosetting resin, such as epoxy resin.

In some embodiments, the length of each divided fiber sheet 9 along the circumferential direction Dc of the tank 1, that is, the winding direction is a length that allows the divided fiber sheet 9 to be wound one to two turns on the tank 1 along the circumferential direction Dc thereof, for example, so that the divided fiber sheet 9 can be stacked in one to two layers. In the example illustrated in FIG. 2, each divided fiber sheet 9 is wound two turns on the tank 1 along the circumferential direction Dc thereof, and is stacked in two layers on the tank 1 along the radial direction thereof. The start end 9b of a divided fiber sheet 9 on the upper layer side is stacked in an overlapped manner on the terminal end 9e of a divided fiber sheet 9 wound on the lower layer side, by a predetermined overlapped length.

The tank 1 of this embodiment satisfies the following Inequality (1), where the overlapped length of the start end 9b of the divided fiber sheet on the upper layer side, which is stacked in an overlapped manner on the terminal end 9e of the divided fiber sheet 9 wound on the lower layer side, is indicated by X, the tensile stress applied to the tank 1 in the circumferential direction Dc thereof is indicated by a, the thickness and width of each divided fiber sheet 9 are indicated by t and W, respectively, the length of the cylindrical portion 3 of the tank 1 is indicated by L, and the shearing strength of the resin 10 for integrating the divided fiber sheets 9 is indicated by A.

$$X > (\sigma \cdot t \cdot L)/(A \cdot W) \tag{1}$$

Figure 3:
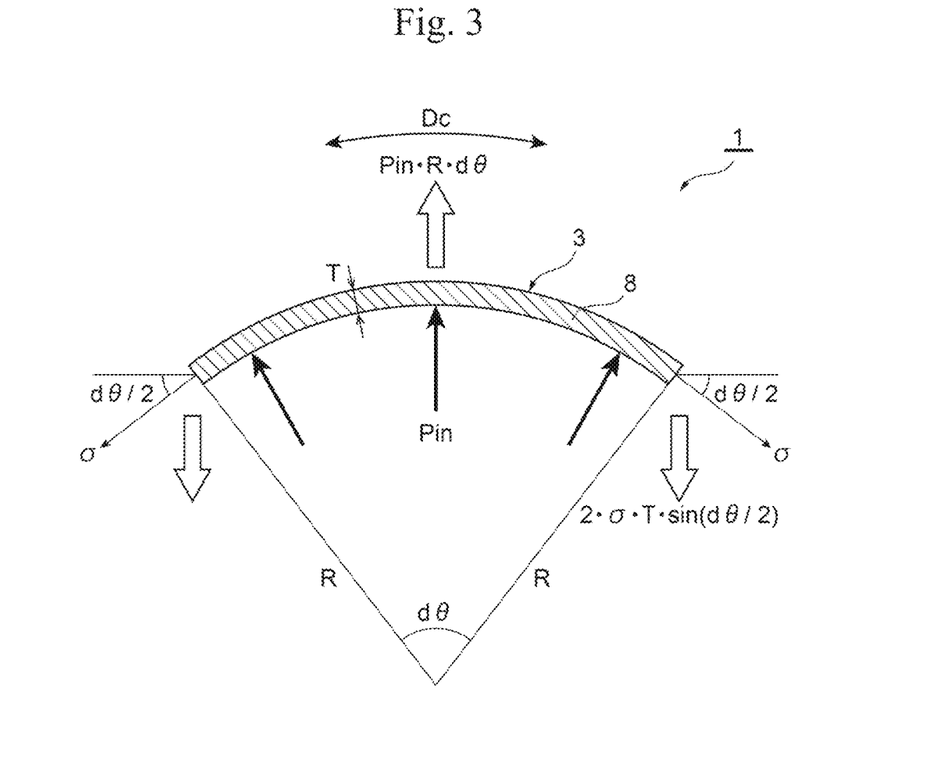
FIG. 3 is a schematic view illustrating the balance of a force on a cylindrical portion of the tank illustrated in FIG. 1.

FIG. 3 is a schematic view illustrating the balance of a force on the cylindrical portion 3 that receives the internal pressure of the tank illustrated in FIG. 1. When the tank 1 is filled with a fluid, such as high-pressure hydrogen gas, tensile stress in the circumferential direction Dc of the tank 1 is applied to the divided fiber sheets 9 that form the sheet layer 8 of the tank 1. Herein, provided that the internal pressure of the tank 1 is indicated by $P_{in}$, the radius of the sheet layer 8 is indicated by R, the thickness of the sheet layer 8 is indicated by T, and the central angle of the cross-section of the tank 1 along the radial direction thereof is indicated by dθ, the balance of a force on the cylindrical portion 3 of the tank 1 that receives the internal pressure $P_{in}$ can be represented by the following Formula (2).

$$P_{in} \cdot R \cdot d\theta - 2 \cdot \sigma \cdot T \cdot \sin(d\theta/2) = 0 \quad (2)$$

Herein, if $d\theta$ is sufficiently small, approximation can be performed such that $\sin(d\theta/2) \approx d\theta/2$ in Formula (2) above. Thus, the following Formula (3) is derived.

$$\sigma = (P_{in}/T) \cdot R \quad (3)$$

For example, assume that the internal pressure $P_{in}$ of the tank 1 is 160 MPa, the thickness T of the sheet layer 8 is 3 mm, and the radius R of the sheet layer 8 is 60 mm. In such a case, tensile stress $\sigma$ in the circumferential direction Dc that is applied to the sheet layer 8 of the tank 1 is calculated as 3200 Mpa from Formula (3) above. Herein, the strength of the liner 7 is not taken into consideration.

Figure 4:
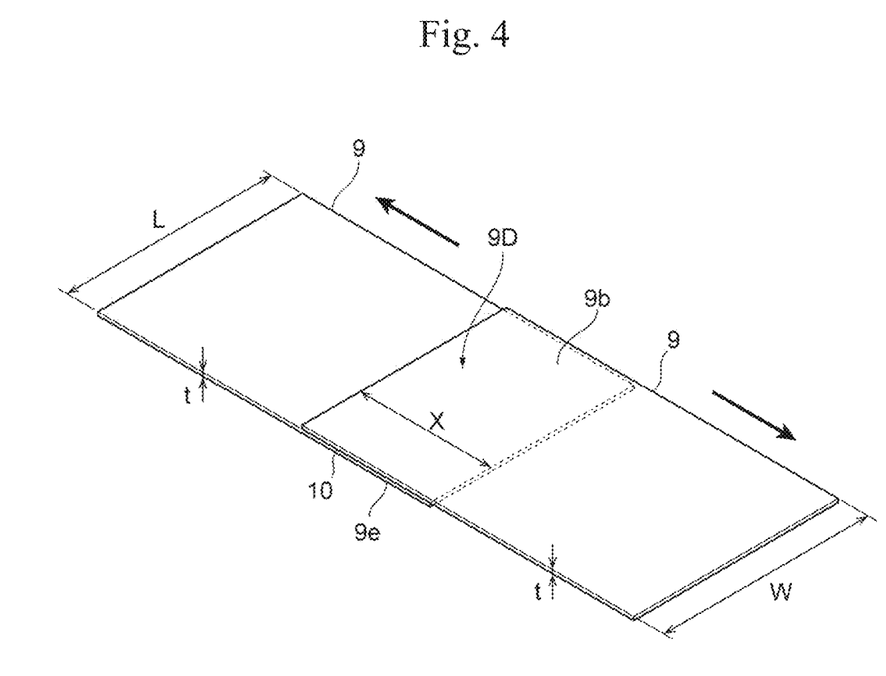
FIG. 4 is a schematic view of an overlapped portion of divided fiber sheets illustrated in FIG. 2.

FIG. 4 is a schematic view of an overlapped portion 9D of the terminal end 9e of the divided fiber sheet 9 wound on the lower layer side and the start end 9b of the divided fiber sheet 9 wound thereon on the upper layer side. In the sheet layer 8, if a shear load on the overlapped portion 9D of the terminal end 9e of the divided fiber sheet 9 wound on the lower layer side and the start end 9b of the divided fiber sheet 9 wound thereon on the upper layer side is greater than a tensile load applied to the divided fiber sheets 9, it can be said that the overlapped portion 9D has a sufficient shearing strength. That is, if the following Formula (4) is satisfied, it can be said that the overlapped portion 9D of the terminal end 9e of the divided fiber sheet 9 on the lower layer side and the start end 9b of the divided fiber sheet 9 on the upper layer side has a sufficient shearing strength.

$$\sigma \cdot t \cdot L < A \cdot X \cdot W \quad (4)$$

In Formula (4) above, symbol a indicates tensile stress in the circumferential direction Dc that is applied to the tank 1, and can be determined from Formula (3) above. Symbols t and W indicate the thickness and width of a single layer of each divided fiber sheet 9, respectively. In addition, symbol L indicates the length of the cylindrical portion 3 of the tank 1 along the direction of the central axis 6 excluding the dome-like portions 2. Symbol A indicates the shearing strength of the resin 10 that forms the sheet layer 8. Symbol X indicates the overlapped length of the terminal end 9e and the start end 9b of the divided fiber sheets 9.

The left side of Formula (4) above indicates a tensile load applied to the divided fiber sheets 9. The right side of Formula (4) above indicates a shear load on the overlapped portion 9D of the terminal end 9e of the divided fiber sheet 9 wound on the lower layer side and the start end 9b of the divided fiber sheet 9 wound thereon on the upper layer side in the sheet layer 8. Deforming Formula (4) above can obtain Formula (1) above.

Next, a tank production method in accordance with an embodiment of the present disclosure will be described based on a comparison with the conventional tank production method.

Figure 7:
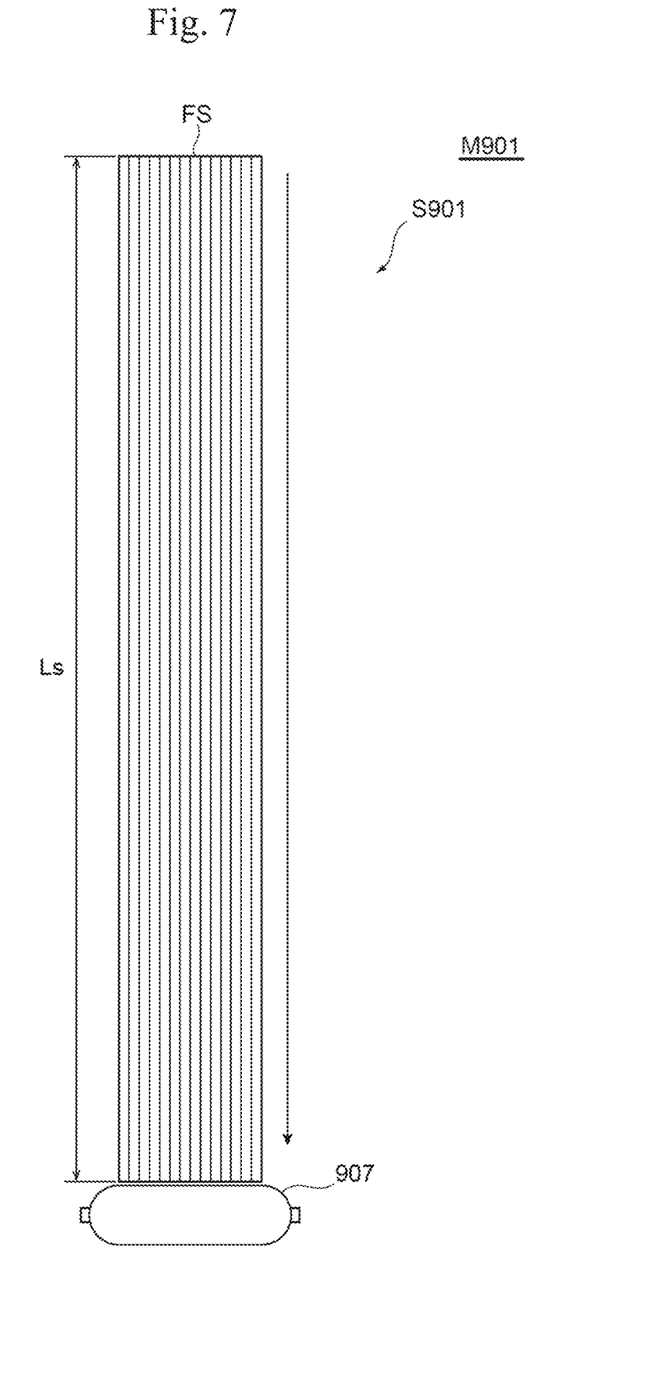
FIG. 7 is an illustration view of a winding step of the conventional tank production method.

FIG. 7 is an illustration view of a winding step S901 of the conventional tank production method M901. For example, the conventional tank production method M901 described in JP 2016-223569 A above includes a winding step S901 of winding a fiber sheet FS impregnated with resin so as to form a sheet layer with a predetermined thickness T. More specifically, the conventional tank production method M901 includes a step of winding a fiber sheet FS impregnated with resin on a mandrel with higher rigidity than that of the liner 907, and heating and curing the resin so as to form a sheet layer.

In the winding step S901 of the conventional tank production method M901, a fiber sheet FS, which has an width equal to the axial length of the cylindrical portion of the liner 907, is continuously wound several ten turns on the mandrel along the circumferential direction thereof, using a sheet winding method so as to form a sheet layer with a predetermined thickness. However, if a fiber sheet FS is continuously wound at once, there is a possibility that the resulting sheet layer may have generated therein non-uniform stacked portions, such as distortion or local gaps of the fiber sheet FS, due to slight fluctuations of the tension applied thereto, very small variations in the thickness of the fiber sheet FS, and the like.

Figure 8:
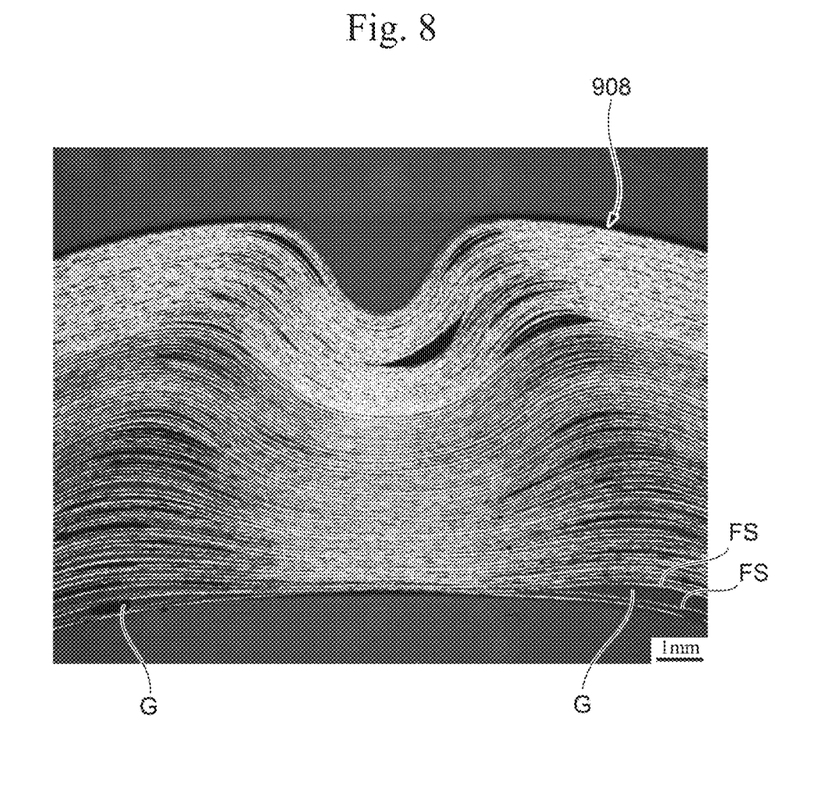
FIG. 8 is a cross-sectional photograph illustrating an example of a non-uniform stacked portion generated when the conventional tank production method is used.
Figure 9:
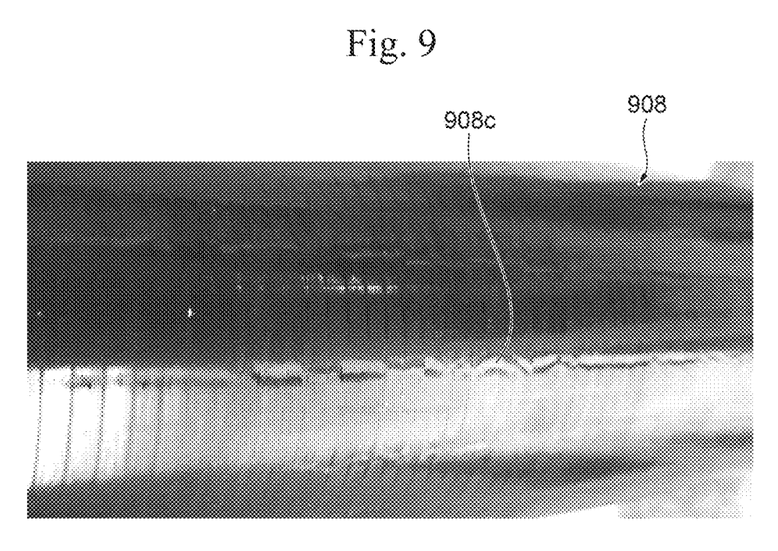
FIG. 9 is a photograph of the appearance of a wrinkle in a sheet layer resulting from the non-uniform stacked portion illustrated in FIG. 8.

FIG. 8 is a cross-sectional photograph illustrating an example of a non-uniform stacked portion that may be generated when the conventional tank production method M901 is used. FIG. 9 is a photograph of the appearance of an example of a wrinkle 908c on the outer surface of a sheet layer 908 resulting from the non-uniform stacked portion illustrated in FIG. 8.

In the example illustrated in FIG. 8, distortion of the fiber sheets FS occurs due to slight fluctuations of the tension applied thereto in the winding step S901, very small variations in the thickness of the fiber sheets FS, and the like, and thus, a local gap G is generated between a fiber sheet FS wound in the second turn and a fiber sheet FS wound in the third turn. Accordingly, a slight wave-like deflection occurs in the fiber sheet FS wound in the third turn. After that, as the number of turns of fiber sheets FS is increased, the deflection of the fiber sheets FS expands, and finally, a recessed wrinkle 908c is formed on the outer surface of the sheet layer 908 as illustrated in FIG. 9.

Such deflection or distortion of the fiber sheets FS that form the sheet layer 908 can become a factor to decrease the strength of the sheet layer 908. Meanwhile, if the number of turns of fiber sheets FS is increased to compensate for the decrease in the strength of the sheet layer 908, which would occur due to deflection or distortion of the fiber sheets FS that form the sheet layer 908, the production cost of the tank would increase. Further, when a fiber sheet FS with a length Ls required to form the sheet layer 908 with a predetermined thickness is continuously wound at a time, if the tension is controlled with high accuracy or if the velocity of winding is reduced to prevent generation of distortion or deviation of the fiber sheets FS, the cost of the production facility would increase, which can decrease the productivity.

Figure 5:
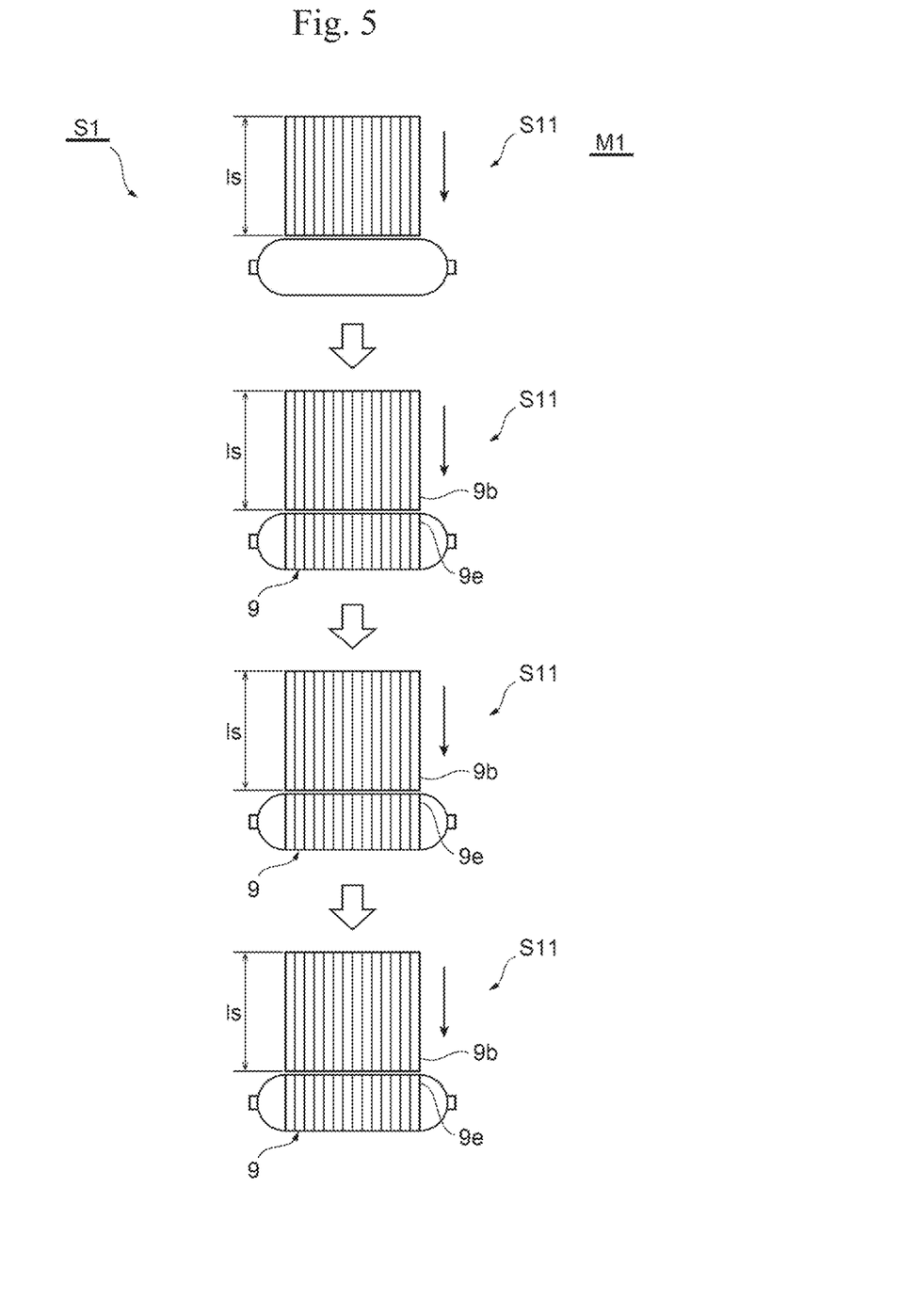
FIG. 5 is an illustration view of a winding step of a tank production method in accordance with an embodiment of the present disclosure.

In contrast, the tank production method of this embodiment has a winding step described below. FIG. 5 is an illustration view of a tank production method M1 in accordance with an embodiment of the present disclosure. In the tank production method M1 of this embodiment, known steps can be used for the steps other than the winding step S1 described below. Therefore, the description of the steps other than the winding step S1 will be omitted.

The tank production method M1 of this embodiment includes a winding step S1 of winding a fiber sheet FS impregnated with resin 10 so as to form a sheet layer 8 with a predetermined thickness T as in the aforementioned conventional production method M901. However, in the tank production method M1 of this embodiment, the winding step S1 has a different technical feature from that of the aforementioned conventional production method M901. More specifically, in the tank production method M1 of this embodiment, the winding step S1 includes a plurality of divided winding steps S11 of winding divided fiber sheets 9 that have been obtained by dividing a fiber sheet FS into a plurality of divided fiber sheets having a length ls shorter than the length Ls required to form the sheet layer 8 with the predetermined thickness T.

That is, the tank production method M1 of this embodiment does not continuously wind a single fiber sheet FS with the length Ls required to form the sheet layer 8 with the predetermined thickness T in the winding step S1. Instead, the fiber sheet FS is divided into a plurality of divided fiber sheets having the length ls shorter than the length Ls required to form the sheet layer 8 with the predetermined thickness T, and the divided fiber sheets 9 are wound through the plurality of divided winding steps S11 so as to form the sheet layer 8 with the predetermined thickness T.

Accordingly, in each of the divided winding steps S11, the divided fiber sheets 9 can be wound with a more uniform tension applied thereto in comparison with a non-uniform tension that would be applied when a single long fiber sheet FS is continuously wound. Therefore, according to the tank production method M1 of this embodiment, it is possible to uniformly stack the divided fiber sheets 9 while preventing generation of distortion or local gaps of the divided fiber sheets 9 that form the sheet layer 8, independently of very small variations in the thickness of the divided fiber sheets 9 and the like.

Figure 6:
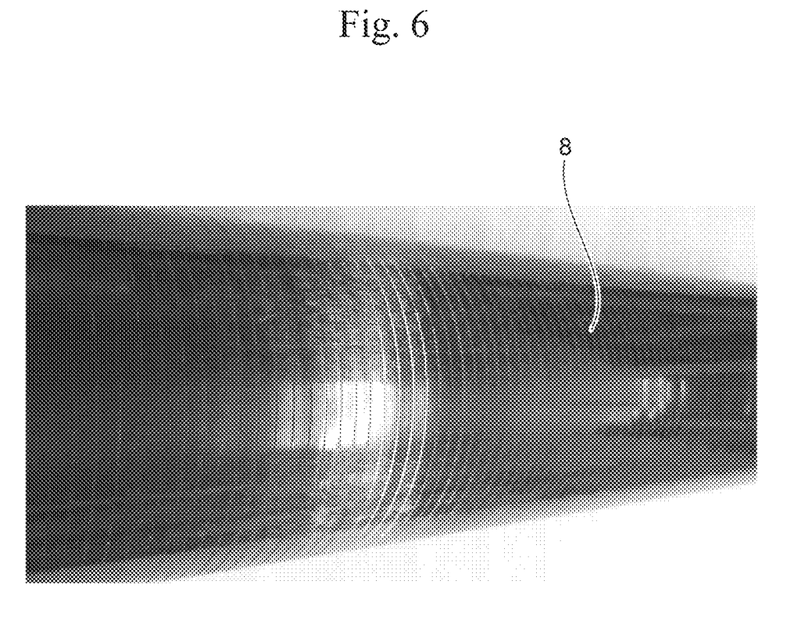
FIG. 6 is a photograph of the appearance of a sheet layer formed through the winding step illustrated in FIG. 5.

FIG. 6 is a photograph of the appearance of the sheet layer 8 formed through the winding step S1 illustrated in FIG. 5. According to the tank production method M1 of this embodiment, it is possible to, in the winding step S1, uniformly stack the divided fiber sheets 9 while preventing generation of distortion or local gaps of the divided fiber sheets 9 as described above. Accordingly, generation of dents such as wrinkles, which would traverse the wound direction of the divided fiber sheets 9, on the surface of the sheet layer 8 of the tank 1 can be prevented as illustrated in FIG. 6.

Figure 10:
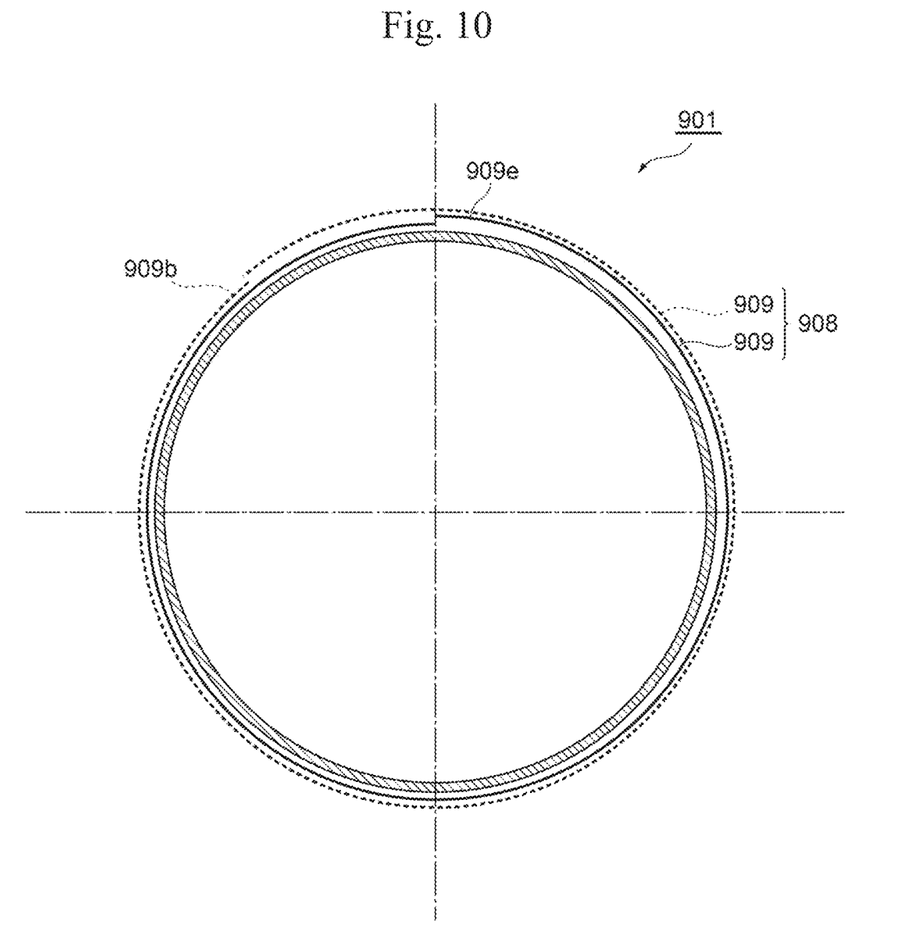
FIG. 10 is a schematic view illustrating an example of a tank of a comparative example.

FIG. 10 is a schematic view illustrating an example of a tank 901 of a comparative example, which differs from the tank 1 of this embodiment illustrated in FIG. 2. In the tank 901 of the comparative example illustrated in FIG. 10, the terminal end 909e of a divided fiber sheet 909 on the lower layer side that form a sheet layer 908, and the start end 909b of a divided fiber sheet 909 wound thereon on the upper layer side have no overlapped portions. In such a case, there is a possibility that the strength against the tensile stress a applied between the terminal end 909e of the divided fiber sheet 909 on the lower layer side and the start end 909b of the divided fiber sheet 909 on the upper layer side would decrease, and thus, the strength of the tank 901 can become insufficient.

In contrast, according to the tank production method M1 of this embodiment, in the second divided winding step S11 or each of the second and following divided winding step S11 illustrated in FIG. 5, the start end 9b of a new divided fiber sheet 9 is stacked in an overlapped manner on the terminal end 9e of the divided fiber sheet 9 that has been wound in the preceding divided winding step S11 by an overlapped length X, as illustrated in FIGS. 2 and 4. The overlapped length X is set so as to satisfy Inequality (1) above.

More specifically, as illustrated in FIG. 3, for example, assume that the internal pressure $P_{in}$ of the tank 1 is 160 MPa, the thickness T of the sheet layer 8 is 3 mm, and the radius R on the inner surface of the sheet layer 8 is 60 mm. In such a case, tensile stress a in the circumferential direction Dc that is applied to the sheet layer 8 of the tank 1 is calculated as 3200 Mpa from Formula (3) above.

In addition, as illustrated in FIG. 4, assume that the thickness t of a single sheet of each divided fiber sheet 9 is 0.1 mm, the shearing strength A of resin 10 that integrates the plurality of divided fiber sheets 9 is 20 Mpa, and the length L of the cylindrical portion 3 of the tank 1 is equal to the width W of each divided fiber sheet 9. In such a case, the overlapped length X of the terminal end 9e of the divided fiber sheet 9 on the lower layer side and the start end 9b of the divided fiber sheet 9 wound thereon on the upper layer side is set to greater than 16 mm so as to satisfy Inequality (1) above. It should be noted that the plurality of divided fiber sheets 9 are wound about 30 to 40 turns in total on the tank 1 along the circumferential direction Dc thereof, so that about 30 to 40 layers are stacked on the tank 1 along the radial direction thereof, thereby forming the sheet layer 8.

As described above, when the overlapped length X satisfies Inequality (1) above, the overlapped portion 9D of the terminal end 9e of the divided fiber sheet 9 on the lower layer side that form the sheet layer 8 and the start end 9b of the divided fiber sheet 9 wound thereon on the upper layer side can have a shearing strength that is sufficient to withstand the tensile stress a applied to the tank 1 in the circumferential direction Dc thereof, as described above. Therefore, according to the tank production method M1 of this embodiment and the tank 1 produced with the production method M1, a sufficient strength of the tank 1 with the plurality of divided fiber sheets 9 wound thereon can be secured.

In addition, in the tank production method M1 of this embodiment, in the divided winding step S11, the length of each divided fiber sheet 9 may be set to a length that allows the divided fiber sheet 9 to be wound one to two turns on the tank 1 along the circumferential direction Dc thereof so that the divided fiber sheet 9 can be stacked in one to two layers. Accordingly, as illustrated in FIG. 2, each divided fiber sheet 9 is stacked by being wound one to two turns on the tank 1 along the circumferential direction Dc thereof, and thus, deviation or distortion of the divided fiber sheet 9 can be significantly suppressed while it is wound.

It should be noted that in the tank production method M1 of this embodiment, after a plurality of divided fiber sheets 9 are wound around a mandrel and the resin 10 impregnating the divided fiber sheets 9 is cured to form the sheet layer 8 in the winding step S1, the mandrel may be pulled out and a liner 7 may be inserted into the sheet layer 8. Alternatively, in the tank production method M1 of this embodiment, in the winding step S1, a plurality of divided fiber sheets 9 may be directly wound around the liner 7, and the resin 10 impregnating the divided fiber sheets 9 may be cured to form the sheet layer 8.

As described above, the tank production method M1 of this embodiment includes the winding step S1 of winding a fiber sheet impregnated with the resin 10 so as to form the sheet layer 8 with the predetermined thickness T. The winding step S includes a plurality of divided winding steps S11 of winding divided fiber sheets 9 that have been obtained by dividing a fiber sheet FS into a plurality of divided fiber sheets having a length ls shorter than the length Ls required to form the sheet layer 8 with the predetermined thickness T. Then, in the second winding steps S11 or each of the second and following winding step S11, provided that the overlapped length of the start end 9b of a new divided fiber sheet 9 that is stacked in an overlapped manner on the terminal end 9e of the divided fiber sheet 9 wound in the preceding divided winding step S11 is indicated by X, tensile stress in the circumferential direction Dc that is applied to the tank 1 is indicated by a, the thickness and width of each divided fiber sheet 9 are indicated by t and W, respectively, the length of the cylindrical portion 3 of the tank 1 is indicated by L, and the shearing strength of the resin 10 is indicated by A, Inequality (1) above is satisfied, that is, $X > (\sigma \cdot t \cdot L)/(A \cdot W)$ is satisfied.

In addition, the tank 1 of this embodiment includes the sheet layer 8 with the predetermined thickness T. The sheet layer 8 is stacked by being wound on the tank 1 along the circumferential direction Dc thereof, and includes a plurality of divided fiber sheets 9 integrated by the resin 10. In addition, provided that the overlapped length of the start end 9b of a divided fiber sheet 9 on the upper layer side that is stacked in an overlapped manner on the terminal end 9e of a divided fiber sheet 9 wound on the lower layer side is indicated by X, the tensile stress applied to the tank 1 in the circumferential direction Dc thereof is indicated by a, the thickness and width of each divided fiber sheet 9 are indicated by t and W, respectively, the length of the cylindrical portion 3 of the tank 1 is indicated by L, and the shearing strength of the resin 10 is indicated by A, Inequality (1) above is satisfied, that is, $X > (\sigma \cdot t \cdot L)/(A \cdot W)$ is satisfied.

According to the tank production method M1 and the tank 1 with such a configuration, it is possible to prevent generation of non-uniform stacked portions in the sheet layer 8 while securing the strength of the tank 1, and thus, prevent generation of dents such as wrinkles, which would traverse the wound direction of the divided fiber sheets 9, on the surface of the sheet layer 8, as described above.

Although the embodiments of the present disclosure have been described in detail above with reference to the drawings, specific configurations are not limited thereto, and any design changes that are within the spirit and scope of the present disclosure are all included in the present disclosure.

DESCRIPTION OF SYMBOLS

1 Tank
3 Cylindrical portion
8 Sheet layer
9 Divided fiber sheet
9b Start end
9e Terminal end
10 Resin
A Shearing strength
Dc Circumferential direction
FS Fiber sheet
L Length of cylindrical portion
Ls Length of fiber sheet
Ls Length of divided fiber sheet
M1 Tank production method
S1 Winding step
S11 Divided winding step
T Predetermined thickness
T Thickness
W Width
X Overlapped length
σ Tensile stress

What is claimed is:

1. A tank production method of a tank having a cylindrical portion and domed ends, comprising a winding step of winding a fiber sheet impregnated with resin on a mandrel or a liner so as to form a sheet layer with a predetermined thickness, and a curing step of curing the resin impregnating the fiber sheets,
wherein:
the winding step includes a plurality of divided winding steps of winding divided fiber sheets that have been obtained by dividing a fiber sheet into a plurality of divided fiber sheets having a length shorter than a length required to form the sheet layer with the predetermined thickness, the divided fiber sheets having the same fiber orientation;
the plurality of winding steps comprises a first winding step of winding the divided fiber sheets on the mandrel or the liner and a second and following divided winding steps, where an overlapped length of a start end of a new divided fiber sheet that is stacked in an overlapped manner on a terminal end of a divided fiber sheet wound in the preceding divided winding step is indicated by X.

2. The tank production method according to claim 1, wherein:
in each divided winding step, a length of each divided fiber sheet is set to a length that allows the divided fiber sheet to be wound one to two turns on the tank along the circumferential direction thereof so that the divided fiber sheet is stacked in one to two layers.

\* \* \* \* \*